(12) United States Patent
Liu et al.

(10) Patent No.: US 11,321,322 B2
(45) Date of Patent: May 3, 2022

(54) LIGHTWEIGHT DBMS BASED ON FUNCTIONAL MICROSERVICES

(71) Applicant: INTERNATIONAL BUSINESS MACHINES CORPORATION, Armonk, NY (US)

(72) Inventors: Xin Peng Liu, Beijing (CN); Meng Wan, Beijing (CN); Shuo Li, Beijing (CN); Xiaobo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 16/834,369

(22) Filed: Mar. 30, 2020

(65) Prior Publication Data
US 2021/0303577 A1   Sep. 30, 2021

(51) Int. Cl.
*G06F 7/00* (2006.01)
*G06F 16/2453* (2019.01)
(Continued)

(52) U.S. Cl.
CPC .. *G06F 16/24549* (2019.01); *G06F 16/24539* (2019.01); *G06F 16/24542* (2019.01); *G06N 5/04* (2013.01); *G06N 20/00* (2019.01)

(58) Field of Classification Search
CPC ......... G06F 16/24549; G06F 16/24539; G06F 16/24542; G06N 20/00; G06N 5/04
(Continued)

(56) References Cited

U.S. PATENT DOCUMENTS

| 10,178,073 | B2 | 1/2019 | Shaposhnik | |
| 2018/0129708 | A1* | 5/2018 | Beavin | G06F 16/24552 |
| 2020/0183936 | A1* | 6/2020 | Ramesh | G06N 20/00 |

FOREIGN PATENT DOCUMENTS

| CN | 104572761 A | 4/2015 |
| EP | 3411785 A1 | 12/2018 |

OTHER PUBLICATIONS

Behara, Samir; Breaking the Monolithic Database in Your Microservices Architecture; Microservices Zone Tutorial Sep. 12, 2018; 5 pages.
(Continued)

*Primary Examiner* — Md I Uddin
(74) *Attorney, Agent, or Firm* — Schmeiser, Olsen & Watts; Stephanie Carusillo

(57) ABSTRACT

A lightweight database-management system (DBMS) is based on a dynamic microservices architecture that implements each granular DBMS feature or function as a distinct, independently executable microservice. The DBMS's Parser front-end responds to each incoming query by selecting the first bind-time database feature needed to process the query. The Parser forwards its selection through a Channel-Binding subsystem to an Event Services Activation subsystem that activates a corresponding microservice to perform the selected feature. The first feature then selects the next required bind-time feature for activation, and this process continues sequentially until all required bind-time microservices have been identified, activated, and run. Runtime query-processing features are then sequentially selected in a similar manner. However, each selected runtime microservice is preloaded but not run. Only when all runtime functions have been identified does the Parser send an asynchronous message to the Channel-Binding subsystem directing the DBMS engine to run the preloaded runtime microservices.

17 Claims, 6 Drawing Sheets

(51) Int. Cl.
*G06N 5/04* (2006.01)
*G06N 20/00* (2019.01)

(58) Field of Classification Search
USPC .................................................. 707/714, 718
See application file for complete search history.

(56) References Cited

OTHER PUBLICATIONS

Extend Realtime Database with Cloud Functions; https://firebase.google.com/docs/database/extend-with-functions; retrieved from the Internet Sep. 6, 2019; 6 pages.

Mell, Peter et al.; "The NIST Definition of Cloud Computing;" National Institute of Standards and Technology; Special Publication 800-145; Sep. 2011; 7 pages.

\* cited by examiner

FIG. 4 – Prior Art

LIGHTWEIGHT DBMS BASED ON FUNCTIONAL MICROSERVICES

BACKGROUND

The present invention relates in general to database-management systems (DBMSs) and in particular to dynamic, self-configuring DBMSs based on a microservices architecture.

Modern database-management systems are organized into layers of component subsystems that when launched in a certain order can perform an entire class of tasks, such as processing incoming queries. A particular task, however, may require only a small subset of the functions that such components can perform.

SUMMARY

Embodiments of the present invention comprise systems, methods, and computer program products for a lightweight database-management system (DBMS) based on a dynamic microservices architecture that implements each granular DBMS feature or function as a distinct, independently executable microservice. A Parser or other front-end of the DBMS initially responds to each incoming query by selecting a first bind-time database feature needed to process the query. The Parser or equivalent DBMS module forwards its selection through a Channel-Binding subsystem to an Event Services Activation subsystem that activates a corresponding microservice to perform the selected feature. Each selection is forwarded through a component-specific channel that is reserved for selection, activation, and other messages related to functions contained by the DBMS component associated with the specific channel. The first feature then selects the next required bind-time feature for activation, and this process continues sequentially until all required bind-time microservices have been selected, activated, and run on the incoming query. Runtime query-processing features are then sequentially selected in a similar manner. However, each selected runtime microservice, are merely preloaded by the Event Services Activation System, and not immediately run. Only when all runtime functions have been selected and preloaded does the Parser send an asynchronous message to the Channel-Binding subsystem directing the DBMS engine to run the preloaded runtime microservices. Certain embodiments enhance this process through cognitive computing, machine-learning, and other methods of artificial intelligence that aid in the selection of each feature. Other embodiments generate query-processing images that identify specific combinations of feature selections as a function of query type, time of day, query-submission location, user classification, or other factors. In such cases, the DBMS may refer to such images in order to refine previously determined selections.

DETAILED DESCRIPTION

Figure 1:
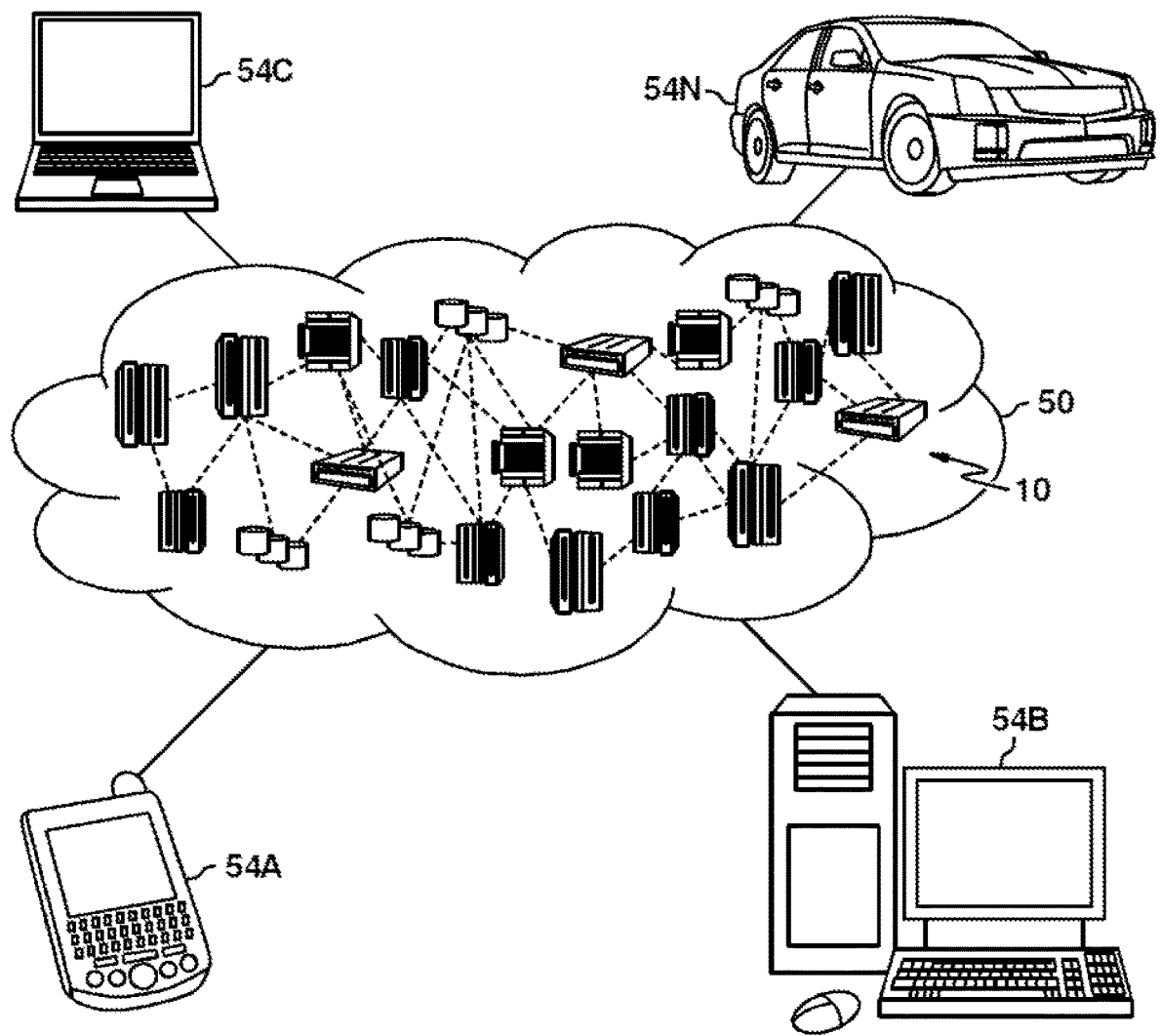
FIG. 1 depicts a cloud computing environment according to an embodiment of the present invention.

Function-as-a-Service cloud services allow tenants of a cloud-computing platform to develop and use specific types of serverless functionality provided by a cloud-hosted application. Some embodiments of the present invention implement a microservices-architecture database-management system (DBMS) as a Function as a service (FaaS) application. Such improved DBMSs are capable of providing specific types of database functionality to cloud tenants by activating only those DBMS functions necessary to perform specific tasks requested by users. Within the context of a microservices architecture, activating a microservice is, depending on an implementer's terminology preferences, is equivalent to deploying or compiling a software module that performs the microservice.

For example, if a user-submitted query requires a DBMS embodiment to perform only six of thirty possibly query-processing functions, the DBMS intelligently identifies those six functions and activates, deploys, compiles, binds, or otherwise makes ready to run only the six microservices that perform the six required functions. The resulting executable application is a lightweight version of the DBMS that does not include executable code to perform the 24 functions not needed to process the current query.

This document will for pedagogical reasons, use the term "activate" to specify any sort of operation that readies a microservice to perform its designated function or feature. This terminology should not be construed to limit all embodiments of the present invention to any single narrow "activation" function. For example, in some embodiments, activating a microservice could mean compiling source code into a standalone executable module ready to be run. In other embodiments, activating the microservice could mean selecting and running an already compiled executable. Regardless of whether an embodiment compiles, runs, or merely selects microservices at a particular point in a workflow, all embodiments improve DBMS technology by providing the feature of selectively deploying only those microservices that perform functions, or that implement those DBMS features, necessary to process a particular data-access request.

In this way, embodiments provide an improved type of dynamic, resource-efficient DBMS that automatically reconfigures itself into a specialized, lightweight application capable of performing only those functions necessary to service the current query. Furthermore, embodiments implemented in a multi-user environment activate only an intelligently selected subset of microservices capable of servicing a current mix of incoming queries.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
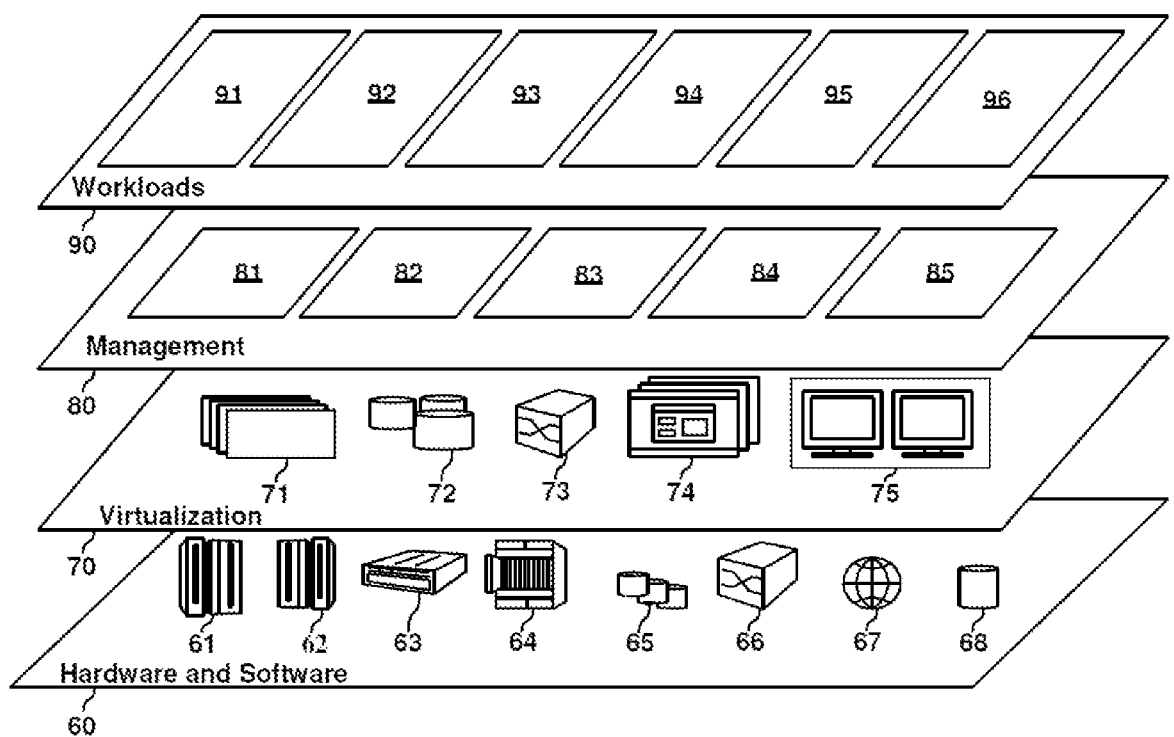
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex methods for a lightweight DBMS based on functional microservices 96.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
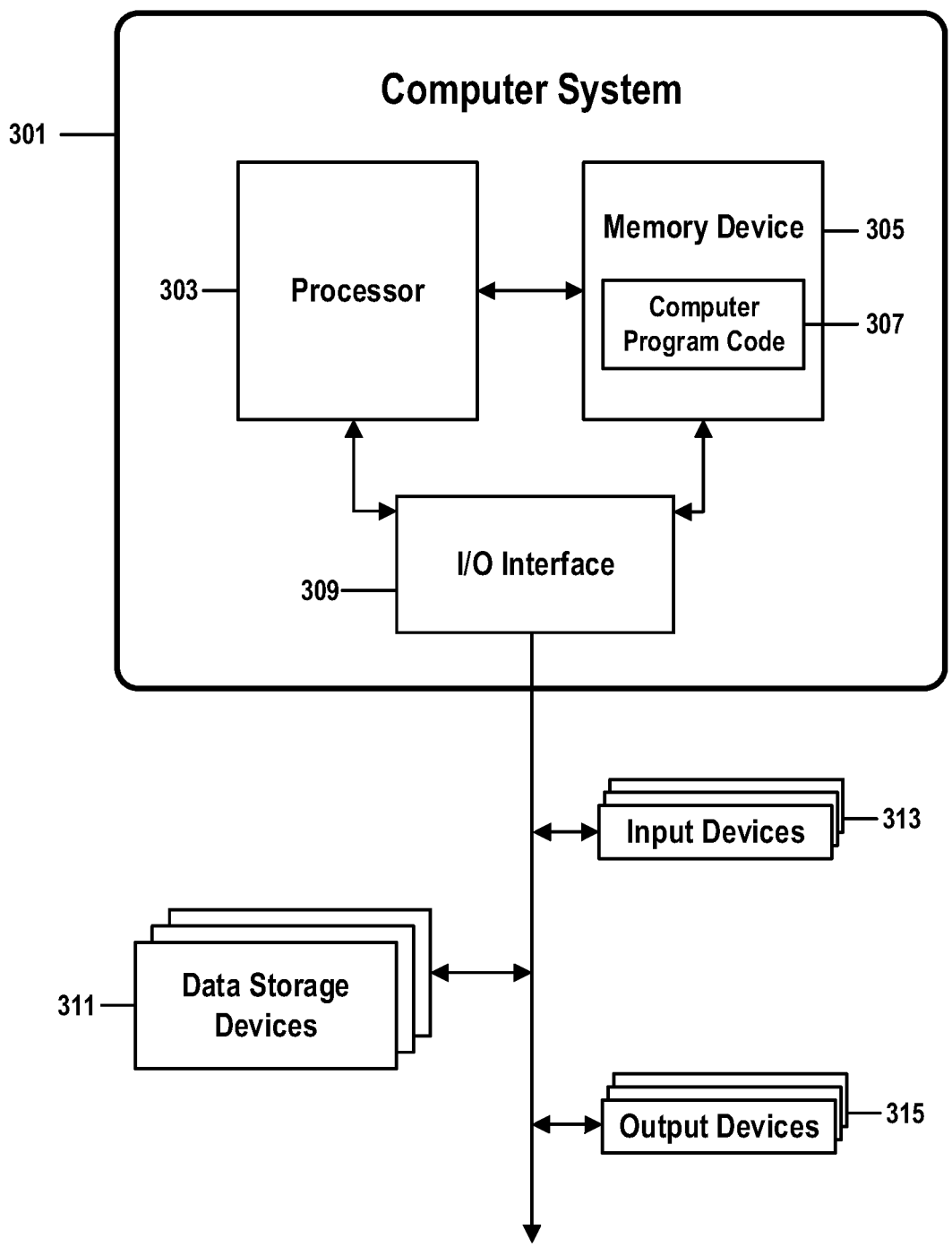
FIG. 3 shows the structure of a computer system and computer program code that may be used to implement a method for a lightweight DBMS based on functional microservices in accordance with embodiments of the present invention.

FIG. 3 shows a structure of a computer system and computer program code that may be used to implement a method for a lightweight DBMS based on functional microservices in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for a lightweight DBMS based on functional microservices in accordance with embodiments of the present invention, and may implement other embodiments described in this specification, including the methods illustrated in FIG. 6. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for a lightweight DBMS based on functional microservices.

Any of the components of the present invention could be created, integrated, hosted, maintained, deployed, managed, serviced, supported, etc. by a service provider who offers to facilitate a method for a lightweight DBMS based on functional microservices. Thus the present invention discloses a process for deploying or integrating computing infrastructure, comprising integrating computer-readable code into the computer system 301, wherein the code in combination with the computer system 301 is capable of performing a method for a lightweight DBMS based on functional microservices.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for a lightweight DBMS based on functional microservices may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for a lightweight DBMS based on functional microservices is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
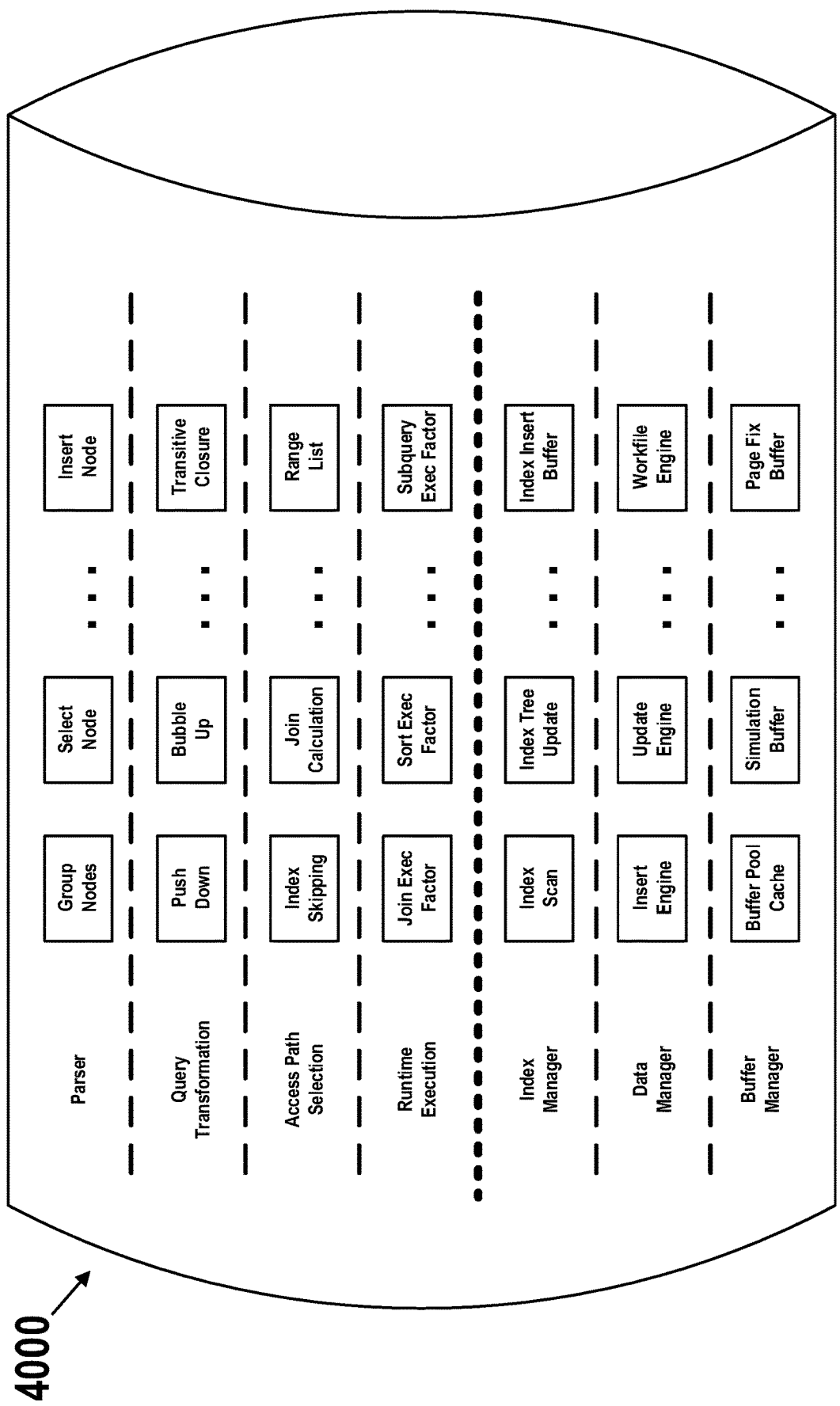
FIG. 4 shows an exemplary portion of a generic DBMS's query-processing architecture.

FIG. 4 shows an exemplary portion of a generic DMBS 4000's query-processing architecture.

The elements shown in FIG. 4's exemplary DBMS 4000 are shown solely to provide background necessary to understand improvements to DBMS technology provided by embodiments of the present invention. FIG. 4 should not be construed to limit such embodiments to only the layers, components, functions, or other elements of DBMS 4000 shown in this figure.

In the example of FIG. 4, an incoming data-access request, such as a query formatted in Structured Query Language (SQL) is processed by an ordered sequence of query-processing functions. These functions are organized top-down into seven layers, components, or subsystems of DBMS 4000, and each layer completes its processing before passing control to the next layer.

For example, the query is initially processed by functions in the Parser layer. Depending on implementation, these functions may include grouping database nodes, selecting a database node, and inserting a new node into the database. After the Parser layer has completed its parsing of the query, control is passed to a Query Transformation layer, which performs functions like push and pop stack operations and transitive closure operations. When these operations are concluded, DBMS 4000 next invokes functions in the Access Path Selection layer, and so forth.

A real-world DBMS can use more, less, or different layers or components to process a query, and each layer or component can be capable of performing numerous functions that are not shown in FIG. 4. The present invention is flexible enough to accommodate any sort of DBMS structure, so long as the DBMS relies upon a discernible, distinct workflow that performs a predictable ordered sequence of functions upon an incoming query.

The exemplary DBMS 4000 divides its layers of functions into two groups. The first four layers, shown above the heavy dotted line, comprise functions performed at bind-time by "Relational Database Service" (RDS) components of the DBMS. Bind-time functions pre-process the query prior to actually running the query's data-access operations on data stored in the database. RDS bind-time functions may, for example, identify a data-access path that will be needed to locate stored database items or generate run-time data structures necessary to facilitate an SQL JOIN operation.

The three layers below the heavy dotted line are "run-time" layers that perform runtime operations that, using access paths, structures, and other results of the RDS components' bind-time operations, perform the database-access operations requested by the query. In some DBMS systems, a discrete runtime database-engine of the DBMS performs these runtime functions.

FIG. 4 is an abbreviated representation of a DBMS, showing only a small part of the functionality that is built into modern database-management systems. Real-world DBMS systems are expected to perform a broad range of sophisticated data-management tasks and, in a multi-user environment, to process many such tasks concurrently. However, an incoming query may require only a small subset of a DBMS's full functionality. Maintaining and running such an extensive system can thus be inefficient.

Embodiments of the present invention improve known DBMS functionality by implementing database-management technology as an FaaS service based on a dynamic, microservices architecture into which has been built the intelligence to identify and activate only those services that are needed to process a particular query. In other words, if only 10% of the functionality supported by a query-processing mechanism of an embodiment is required to process a query, then only the microservices that provide that 10% of the embodiment's functionality would be activated and run.

Figure 5:
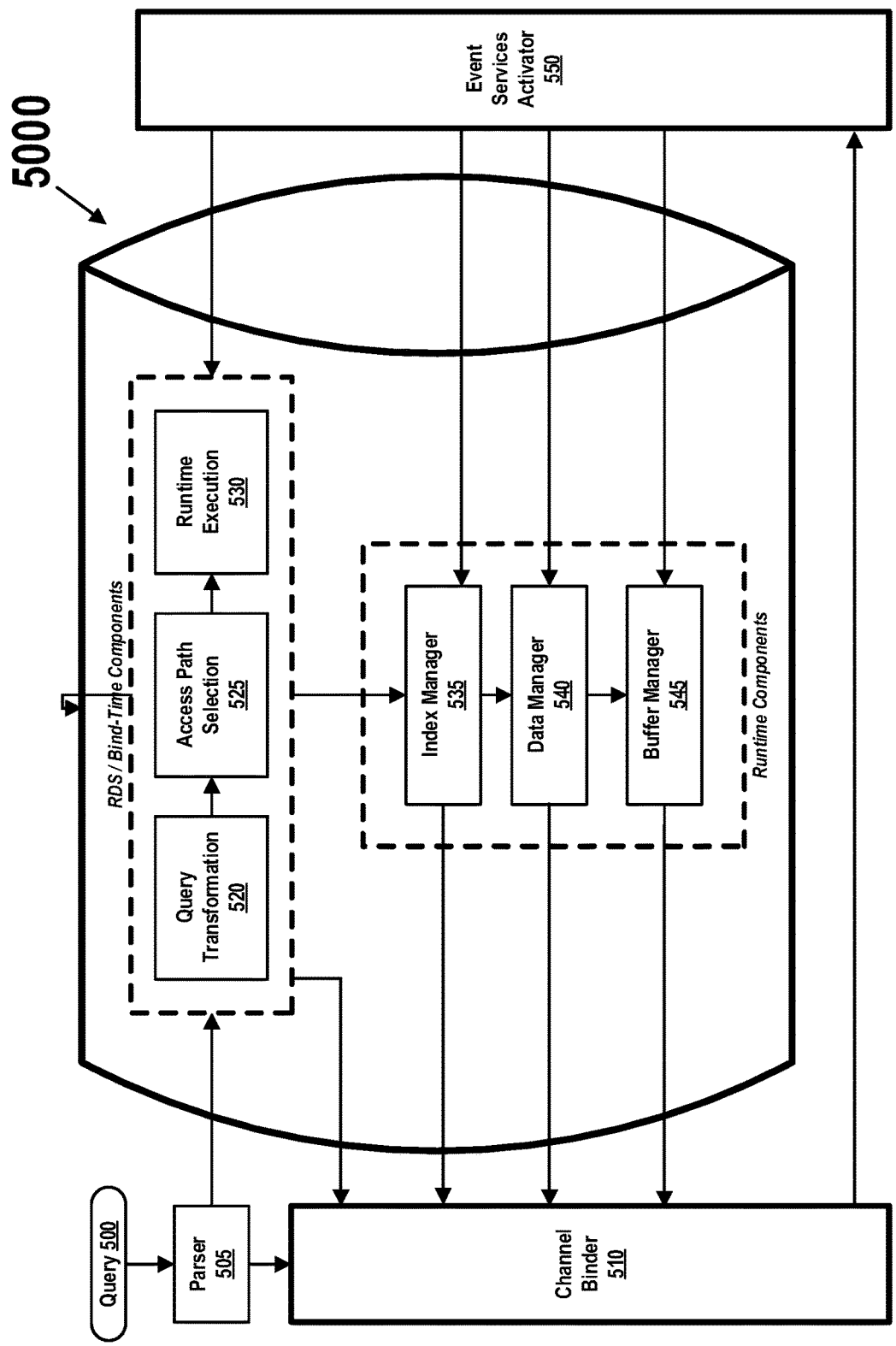
FIG. 5 shows a high-level structure of an improved version of the DBMS of FIG. 4, in accordance with embodiments of the present invention.

FIG. 5 shows a high-level structure of an improved version 5000 of the DBMS 4000 of FIG. 4, in accordance with embodiments of the present invention. FIG. 5 contains items 500-550 and 5000.

Like DBMS 4000 of FIG. 4, improved DBMS 5000 is a simplified representation of a DBMS that shows only three bind-time RDS components 520-530 and three runtime components 535-545. A real-world implementation may comprise additional or different RDS components or runtime components, and each component of the real-world implementation may be capable of performing numerous functions omitted from FIGS. 4 and 5 for clarity.

Furthermore, because embodiments of the present invention are implemented as microservices applications, each of RDS or runtime function is performed by a corresponding microservice. One improvement of DBMS 5000 over known DBMS systems is the increased efficiency and performance provided by this microservices architecture. As explained below, DBMS 5000 activates and runs each microservice only when a current job requires a function performed by the selected microservices.

As will be explained in FIG. 6, the workflow of FIG. 5 begins with the receipt of a user query 500. A Parser component 505 of DBMS 5000 parses the query and selects an initial function to be performed by the first RDS component (Query Transformation 520) of DBMS 5000. In some embodiments, Parser 505 also identifies this selection to a Channel Binder module 510 that binds identifications of each channel's selected functions to a channel dedicated to that channel.

The initially selected function of the first RDS component selects the next function that must be performed in order to process query 500. This next function may be a second function of the Query Transformation component 520, or it may be a function of a subsequent RDS component 525 or 530. This process continues, with each function selecting a next function until all RDS bind-time functions have been selected. These selections are made by logic embedded into each component DBMS 5000 and in some embodiments, the selections are facilitated by information received from Parser 505.

As with the initially selected function, each RDS component 520-530 identifies each selected function to Channel Binder 510. As before, Channel Binder 510 binds (or maps) identifications of each selected function to a communications channel dedicated to the component that comprises each corresponding selected function. For example, if Channel Binder 510 receives notice that the Transitive Closure function of the Query Transformation component 520 is selected, Channel Binder 510 would associate an identification of the Transitive Closure function with a Query Transformation channel.

Once all RDS functions have been identified to the Channel Binder 510, Channel Binder 510 notifies Event Services Activator module 550 that bind-time functions are ready to be performed. In embodiments where this notification is communicated through the component-associated channels notification messages received through each channel identify those functions that are performed by the component associated with the corresponding channel. In some embodiments, all RDS functions are bound to a single bind-time RDS channel that is used to transfer identifications of any function performed by any RDS component.

Event Services Activator 550 responds to these notifications by activating microservices that perform the selected functions for each component. In some embodiments, Event Services Activator 550, rather than activating and running the selected microservices itself, directs the RDS subsystem of DBMS 5000, which comprises RDS components 520-530, to run the microservices in order to perform the selected functions.

At the conclusion of the performance of the final selected bind-time RDS function, the final function selects the first runtime function to be performed next. As with the bind-time functions, each runtime component 535-545 of DBMS 5000 selects functions to be performed by the next runtime component 535-545. Each selected function is identified to Channel Binder 510, which binds the selection to a corresponding, component-specific channel and forwards the identification to Event Services Activator 550 through the corresponding channel. Event Services Activator 550 then activates and runs the microservices that perform the selected runtime functions, or directs the corresponding runtime components 535-545 of DBMS 5000 to activate or run those microservices.

In the embodiment of FIG. 5, no other microservices are activated. The resulting DBMS application 5000 is thus a lightweight, dynamically configured database-management system that loads and runs only those functional modules that are necessary to process the present query.

In certain other embodiments, it is possible that DBMS 5000 may predict that DBMS 5000 may require certain frequently used functions or may require certain functions that are frequently used in conjunction with selected functions. For example, if detecting that query 500 loads a certain database table with a particular type of data, DBMS 5000 may infer from past logs or by means of artificially intelligent machine-learning or cognitive-computing technology, micro-cluster analysis, derivation of SQL execution-signatures probabilities, or other predictive method or technology, that a second query, requesting the creation of a particular report, is imminent. In such a case, DBMS 5000 may preactivate certain microservices needed to generate the report, in order to improve performance if and when the report-generating query arrives.

Other embodiments may take this approach even further, combining frequently used functions into an "image" that identifies a common, task-related set of functions required by queries known to be received at a particular time. For example, if a financial institution generates a large set of prescheduled reporting operations at 9:00 AM every weekday, DBMS 5000 could asynchronously preload an image identifying the database-management functions that will need to be available at those times. In this way, when DBMS 5000 receives each batch request for the reports, the microservices required to service that request will already have been selected, activated, or otherwise prepared to run. In a multi-user environment, or one in which DBMS 5000 is shared by multiple applications, this feature may be elaborated even further by generating multiple images that can be interleaved, run concurrently, run in parallel, or coordinated in any other manner desired by an implementer.

Figure 6:
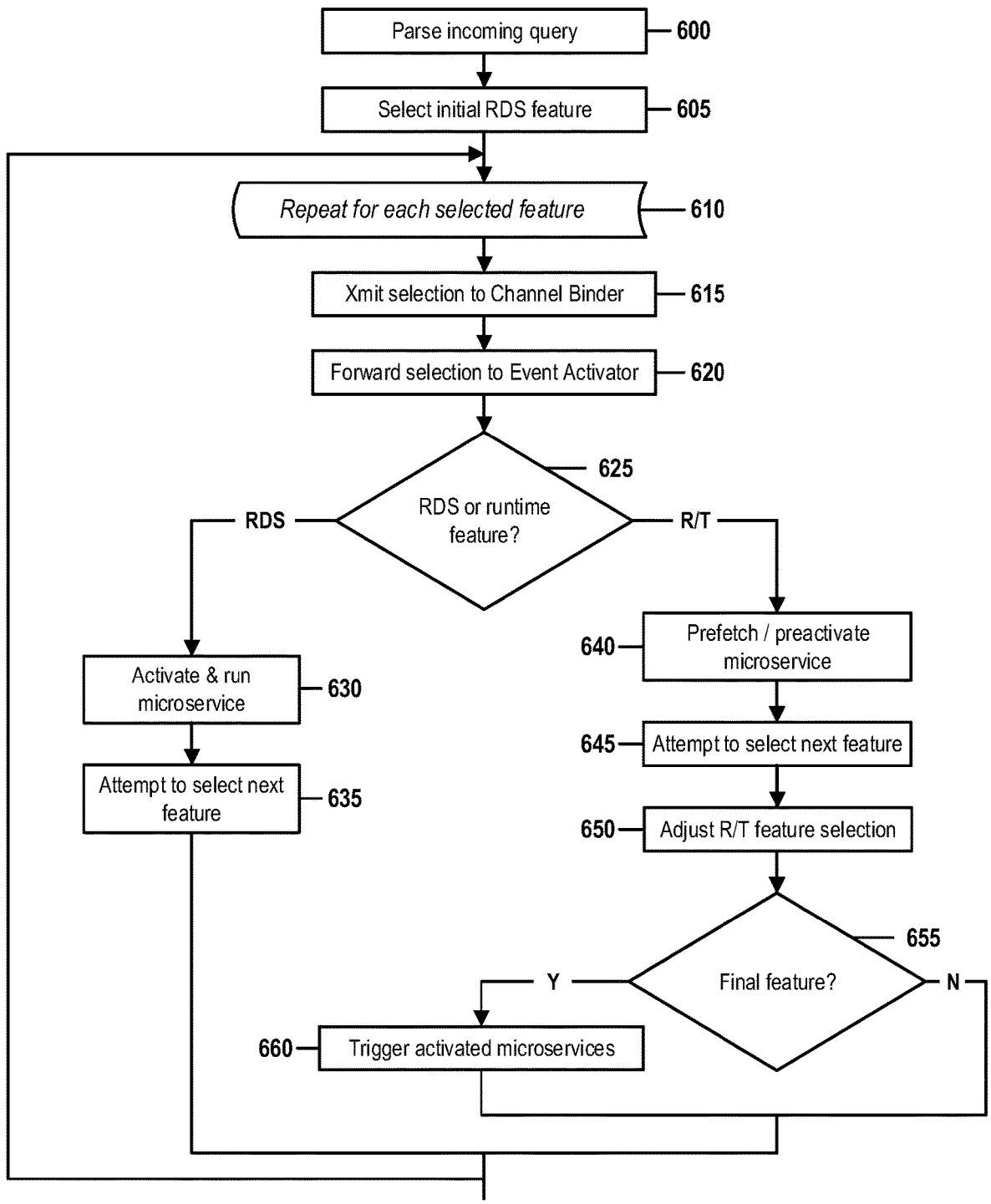
FIG. 6 is a flow chart that illustrates the steps of a method for a lightweight DBMS based on functional microservices in accordance with embodiments of the present invention.

FIG. 6 is a flow chart that illustrates the steps of a method for a lightweight DBMS 5000 based on functional microservices in accordance with embodiments of the present invention. FIG. 6 contains steps 600-660.

In step 600, Parser 505 or a similar parsing component of lightweight DBMS 5000 receives and parses an incoming SQL query or other database-access request. This request may be received from either a computer application or directly from a user through a user interface of DBMS 5000. The parsing may be performed by any means known in the art for parsing a database query, or may be performed by means of a custom procedure preferred by an implementer. In some embodiments, the parsing may follow an algorithm that augments known parsing methods with methods of artificial intelligence or cognitive computing that are added by an implementer in order to provide more accurate or intelligent parsing.

In step 605, Parser 505 or the similar parsing component identifies the first feature or function of DBMS 5000 to be performed in order to process the received query. This selection may be made as a function of the parsing results. For example, if the parsing of step 600 reveals that the received query contains predicates or structures that require an initial performance of a Transitive Closure function of DBMS 5000's Query Transformation component 520, then the Transitive Closure feature would be selected in this step.

In embodiments where the Query Transformation component 520 is always the first component of DBMS 5000 to begin processing a query, this first selected feature or function is always a feature of the Query Transformation component 520 of DBMS 5000. In other embodiments, some or all parsing features may be retained in a Parser component that is internal to DBMS 5000, resulting in the first selected feature or function being a feature of that internal Parser component. In yet other embodiments, the component and function selected in step 605 may be selected from any DBMS layer or component that Parser 505 deems to correspond to the first function that must be performed in order to process the received query. The exact rules and constraints governing this selection may be set by an implementer, so long as they do not contradict or prevent any other operations described in FIG. 6.

Step 610 begins an iterative procedure of steps 610-660, which repeats until all features of DBMS 5000 selected in order to process the received query have been performed.

In step 615, the Parser 505 or parsing component or subsystem of DBMS 5000 forwards the current feature selection to the Channel Binder subsystem 510. In the current example, because Parser 505 has determined that the query-processing procedure should begin with the Transitive Closure feature of Query Transformation component 520 of DBMS 5000. Parser 505 communicates this selection to Channel Binder 510.

In subsequent iterations of steps 610-660, this process is repeated for each selected feature being processed by the current iteration of steps 610-655. However, as will be described below, the selected feature is selected by a parsing component only during the first iteration. Subsequent selections are each made during subsequent iterations by a previously selected feature.

In step 620, Channel Binder 510 identifies the selected feature and the component of DBMS 5000 that contains the selected feature and then selects the particular reserved communications channel that is dedicated to that component, "binding" or mapping the feature to that channel. Channel Binder 510 then sends an identification of the selected, bound feature through the corresponding channel to Event Services Activator subsystem 550.

A channel may be any reserved communications mechanism known in the art. In embodiments in which DBMS 5000 is implemented as an FaaS service on a cloud-computing platform, a channel may be a type of cloud-based virtual infrastructure that allows two provisioned resources to interact synchronously on a hosted platform in which server management, low-level infrastructure, and operating systems have been abstracted to present to users the appearance of a serverless computing environment.

In certain embodiments, Channel Binder 510 may forward identifications of a selected feature through a mechanism other than a reserved channel of a cloud-computing platform. For example, if the present invention is implemented in a non-cloud environment, the identification may be communicated through a conventional wired Ethernet connection or a wireless WiFi link. In some cases, an implementer may choose to omit channel-dependency from an embodiment's architecture, allowing feature identifications to all be transmitted through the same cloud-platform/FaaS channel or other communications path. In such cases, Channel Binder 510 may be omitted or may be replaced by a simpler interface that merely aggregates incoming selections or forwards each selection to the Event Services Activator 550.

In step 625, DBMS 5000 determines whether the currently selected DBMS feature (or, equivalently, function) is a bind-time feature or a runtime feature. A bind-time feature is one that is partially performed prior to actually performing the query. Bind-time features do not require information or values that become available only during the performance of an algorithm. For example, if Parser 505 determines that an incoming query requests a two-table JOIN operation, it is possible to split that query into two subqueries that will each perform a simple one-table access. Because this function merely simplifies the syntax of the query, the function maybe performed prior to running the query against the database. Using the vocabulary of compiler/database technology, the function may be performed by an RDS component of DBMS 5000 at "bind-time," when the instructions that will be directed to the DBMS 5000 are generated.

Runtime features, on the other hand, cannot be performed until the query is actually run. For example, an operation that selects records from a database table cannot be performed until the query is actually executed and queries the data stored in the database. Runtime functions are generally run by a runtime engine subsystem of a DBMS at query-execution time. One way that embodiments and examples of the present invention described in this document improve upon known DBMS systems 4000 is by preselecting runtime features and preactivating corresponding microservices prior to launching the runtime engine. In this way, runtime features may be launched more quickly, improving overall query-processing performance.

If DBMS 5000 in step 625 determines that the currently selected feature is a bind-time feature performed by an RDS component of DBMS 5000, then steps 630-635 are performed. If DBMS 5000 in step 625 determines that the currently selected feature is a runtime feature to be performed by a runtime engine of DBMS 5000, then steps 640-660 are performed.

In step 630, Event Service Activator 550, upon receiving the identification of the currently selected feature from Channel Binder 510, activates the microservice configured to perform that feature and directs that microservice to run.

In step 635, the currently selected feature selects the next feature that must be performed in order to continue processing the received query and forwards this selection to Channel Binder 510. If the currently selected feature is a bind-time feature, this selection may occur as a result of running the selected microservice in step 630. A bind-time feature may select either the next bind-time feature in the query-processing sequence appropriate for the specific received query, or may select the first runtime feature to be performed when the query actually serviced and run.

In step 640, Event Service Activator 550, upon receiving the identification of the currently selected feature from Channel Binder 510, prefetches or preactivates the microservice configured to perform that feature, but does not yet direct that microservice to run.

In step 645, the currently selected runtime feature attempts to select the next feature that must be performed in order to continue processing the received query and forwards this selection to Channel Binder 510. A runtime feature may select either the next runtime feature in the query-processing sequence, or may specify that no more features need be run in order to complete processing the query. In this last case, the method of FIG. 6 ends because no more features may be selected.

Step 645 may be performed by internal logic of DBMS 5000 that partially implements, manages, or is otherwise related to the currently selected feature. In other embodiments, step 645 may be performed by Parser 505 or other parsing subsystem or component of DBMS 5000 capable of identifying a sequence of steps capable of processing the query at runtime. As described earlier, it is also possible that a preselected image, configured to service queries of the type that is currently being processed, is used by DBMS 5000 to select a particular sequence of runtime features. In some cases, Event Services Activator 550, upon receiving notice of a runtime-feature selection, may activate and run a distinct microservice that attempts to select the next runtime feature.

In optional step 650, DBMS 5000 may adjust one or more of the runtime-feature selections using predefined images, machine-learning technology, or a known cognitive-computing, analytics, or other artificially intelligent methodology. For example, a component or subsystem of DBMS 5000 may have been trained, through a machine-learning procedure, to recognize that when a particular sequence of three runtime features follows a certain bind-time feature, that the resulting query-processing procedure must end with a certain terminating runtime operation. If that terminating runtime operation has not yet been selected through the method of FIG. 6, the Parser 505, Channel Binder 510, Event Services Activator 550, or other component or subsystem of DBMS 5000—as chosen by an implementer— adds a selection of the certain terminating runtime feature to the query-processing procedure being assembled by DBMS 5000.

In another example, when certain conditions are met, DBMS 5000 could be configured to prefetch a particular combination of bind-time and runtime functions specified by a predetermined image. For example, if it is known from past performance or from history logs that data-access requests that enter the day's transactions are received from global branch offices every night at 1:00 AM, an image may be created that preselects some or all of the bind-time or runtime features that must be performed in order to process the most common types of those data-access requests. When a data-access request of that type is received at a local time sufficiently close to 1:00 AM, DBMS 5000 correlates the request and the time of submission to infer that the pregenerated image identifies the most likely set of features that must be activated in order to process the request.

In a multi-user computing environment, if multiple types of common queries are known to be submitted concurrently during a particular time period or on a particular day of the week or week of the year, from a particular user base, application, or site, or in relation to some combination of these factors, DBMS 5000 may refer to a single complex image that identifies some or all of the features needed to process two or more types of these queries at the same time. Many other methods of selecting features as functions of a statistical analysis, an interpretation of one or more transaction logs, or of cognitive inferences are possible. The present invention is flexible enough to accommodate any such method desired by an implementer who wishes to augment the method of FIG. 6 with additional intelligence.

All of these variations further improve standard DBMS technology by allowing DBMS 5000 to quickly switch between images predetermined to be likely to identify only those microservices needed to process a particular query. An implementer may assign any desired weighting to feature selections determined by steps 600-645 relative to feature selections predetermined when generating an image.

In either case, when the correct set of features has been selected, only those microservices required to process the current query are activated and run. The resulting subset of microservices form a lightweight, dynamic database-management system that contains only those software modules needed to implement required functionality.

In some embodiments, DBMS 5000 in this case may reconsider all runtime features (or even certain bind-time features) that have been previously selected during prior iterations of steps 610-660. If a cognitive, statistical, or other inferential determination identifies a likelihood that the previous selections may be erroneous, DBMS 5000 may in this step revise those prior selections, regardless of whether the currently selected feature is accepted.

In step 655, DBMS 5000 determines whether the currently selected feature is the final runtime feature that must be performed in order to process the query. If not, the next iteration of steps 610-660 begins. Otherwise, DBMS 5000 concludes the current iteration with step 660.

In step 660, Event Services Activator 550 activates and runs the selected microservices as necessary. In embodiments and examples described in this document, microservices that perform selected runtime features have already been preactivated, allowing the runtime engine subsystem of DBMS 5000 to immediately run and service the received query. In some embodiments, however, if certain features selected in step 650 have not yet been activated, they are both activated and run in this step.

In some embodiments, this step is performed by means of an Execution Signature data structure that contains a bitmap representation of runtime functions available to DBMS 5000. Each time a runtime feature is selected in step 605, 635, or 645, the selection is recorded by setting a corresponding bit in the bitmap. In this type of implementation, step 660 is triggered when Parser 505 or equivalent subsystem or component sends an asynchronous message to Channel Binder 510. This message tells Channel Binder 510 to transmit bound features to Event Services Activator 550, if those features have not yet been transmitted, and to direct Event Services Activator 550 to launch the DBMS runtime engine in order to run the selected, and presumably prefetched, runtime features.

In other embodiments, a different mechanism may be used to trigger the performance of the selected runtime query-processing features. In all cases, however, DBMS 5000 in this step completes its processing of the received query by performing an appropriate sequence of microservices-implemented, runtime functions, and does not load any microservices not needed to perform those selected runtime functions.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A database-management system (DBMS) system comprising a processor, a memory coupled to the processor, and a computer-readable hardware storage device coupled to the processor, the storage device containing program code configured to be run by the processor via the memory to implement a method for a lightweight DBMS based on functional microservices, the method comprising:
   receiving a query that requests access to a database that is managed by the DBMS,
      where the DBMS is based on a microservices architecture, organized into multiple layers, that implements the DBMS as a set of independently activated microservices, and
      where each query-processing function of the DBMS is performed by a corresponding microservice of the set of micro services;
   parsing the query in order to select an initial function that must be performed by the DBMS in order to process the query;
   pre-activating a first microservice of the set of microservices that is configured to perform a most recently selected function,
      where the pre-activating a selected microservice of the set of microservices comprises:
         sending a message through a first channel of a set of cloud-platform communication channels to an Event Service Activator subsystem of the DBMS,
            where the first channel communicates messages requesting pre-activation of the microservices that perform functions belonging to a first component of the layered set of components,
            where the selected microservice performs a first function belonging to the first component, and
            where the message directs the Event Service Activator subsystem to pre-activate the selected microservice;
   accepting, from the first microservice, a selection of a next function that must be performed by the DBMS in order to process the query; and
   repeating the pre-activating and the accepting for each microservice selected to perform a function required to process the query,
      where each pre-activated microservice selects a next microservice of the set of microservices that must be run in order to perform a corresponding next function required to process the query.

2. The system of claim 1,
   where the set of microservices is organized into a layered set of components of the DBMS, and
   where each component of the layered set of components comprises microservices that perform a corresponding class of functions required to process queries received by the DBMS.

3. The system of claim 2,
   where the layered set of components comprises a subset of bind-time components and a subset of runtime components,
   where each bind-time component of the subset of bind-time components comprises query-processing bind-time functions that are performed prior to performance of any selected runtime function,
   where each runtime component of the subset of runtime components comprises query-processing runtime functions performed by runtime microservices that are selected and preloaded prior to performance of any selected runtime function, and
   where all preloaded runtime microservices are run by a runtime engine of the DBMS to perform database-access operations requested by the received query after all selected bind-time functions have been performed and all selected runtime microservices have been preloaded.

4. The system of claim 3, where the DBMS determines through statistical analysis of records of past query-processing tasks that certain runtime functions must be selected whenever certain bind-time functions have been selected.

5. The system of claim 3,
   where the DBMS comprises a cognitive query-processing subsystem that is trained by a method of machine-learning to intelligently draw inferences from records of past DBMS query-processing tasks, and
   where DBMS determines which query-processing runtime functions to select as a function of a semantic meaning inferred from the received query.

6. The system of claim 3,
   where the bind-time components comprise:
      a query-transformation layer,
      an access-path selection layer, and
      a runtime-execution layer, and
   where the runtime components comprise:
      an index-manager layer,
      a data-manager layer, and
      a buffer-manager layer.

7. The system of claim 1, where the DBMS is implemented as a Function as a Service (FaaS) application provisioned on a host cloud-computing platform.

8. A method for a lightweight DBMS based on functional microservices, the method comprising: a database-management system (DBMS) system comprising a processor, a memory coupled to the processor, and a computer-readable hardware storage device coupled to the processor, the storage device containing program code configured to be run by the processor via the memory to implement the method for a lightweight DBMS based on functional microservices, the method comprising:
   receiving a query that requests access to a database that is managed by the DBMS,
      where the DBMS is based on a microservices architecture, organized into multiple layers, that implements the DBMS as a set of independently activated microservices, and
      where each query-processing function of the DBMS is performed by a corresponding microservice of the set of microservices;
   parsing the query in order to select an initial function that must be performed by the DBMS in order to process the query;
   pre-activating a first microservice of the set of microservices that is configured to
   perform a most recently selected function, where the pre-activating a selected microservice of the set of microservices comprises:
  sending a message through a first channel of a set of cloud-platform communication channels to an Event Service Activator subsystem of the DBMS, where the first channel communicates messages requesting pre-activation of the microservices that perform functions belonging to a first component of the layered set of components,
    where the selected microservice performs a first function belonging to the first component, and
    where the message directs the Event Service Activator subsystem to pre-activate the selected microservice;
accepting, from the first microservice, a selection of a next function that must be performed by the DBMS in order to process the query; and
repeating the pre-activating and the accepting for each microservice selected to perform a function required to process the query,
  where each pre-activated microservice selects a next microservice of the set of microservices that must be run in order to perform a corresponding next function required to process the query.

9. The method of claim 8,
where the set of microservices is organized into a layered set of components of the DBMS, and
where each component of the layered set of components comprises microservices that perform a corresponding class of functions required to process queries received by the DBMS.

10. The method of claim 9,
where the layered set of components comprises a subset of bind-time components and a subset of runtime components,
where each bind-time component of the subset of bind-time components comprises query-processing bind-time functions that are performed prior to performance of any selected runtime function,
where each runtime component of the subset of runtime components comprises query-processing runtime functions performed by runtime microservices that are selected and preloaded prior to performance of any selected runtime function, and
where all preloaded runtime microservices are run by a runtime engine of the DBMS to perform database-access operations requested by the received query after all selected bind-time functions have been performed and all selected runtime microservices have been preloaded.

11. The method of claim 10, where the DBMS determines through statistical analysis of records of past query-processing tasks that certain runtime functions must be selected whenever certain bind-time functions have been selected.

12. The method of claim 10,
where the DBMS comprises a cognitive query-processing subsystem that is trained by a method of machine-learning to intelligently draw inferences from records of past DBMS query-processing tasks, and
where DBMS determines which query-processing runtime functions to select as a function of a semantic meaning inferred from the received query.

13. The method of claim 8, further comprising providing at least one support service for at least one of creating, integrating, hosting, maintaining, and deploying computer-readable program code in the computer system, wherein the computer-readable program code in combination with the computer system is configured to implement the receiving, the parsing, the pre-activating, the accepting, and the repeating.

14. A computer program product, comprising a computer-readable hardware storage device having a computer-readable program code stored therein, the program code configured to be executed by a database-management system (DBMS) system comprising a processor, a memory coupled to the processor, and a computer-readable hardware storage device coupled to the processor, the storage device containing program code configured to be run by the processor via the memory to implement a method for a lightweight DBMS based on functional microservices, the method comprising:
receiving a query that requests access to a database that is managed by the DBMS,
  where the DBMS is based on a microservices architecture, organized into multiple layers, that implements the DBMS as a set of independently activated microservices, and
  where each query-processing function of the DBMS is performed by a corresponding microservice of the set of microservices;
parsing the query in order to select an initial function that must be performed by the DBMS in order to process the query;
pre-activating a first microservice of the set of microservices that is configured to
perform a most recently selected function,
  where the pre-activating a selected microservice of the set of microservices comprises:
    sending a message through a first channel of a set of cloud-platform communication channels to an Event Service Activator subsystem of the DBMS, where the first channel communicates messages requesting pre-activation of the microservices that perform functions belonging to a first component of the layered set of components,
      where the selected microservice performs a first function belonging to the first component, and
      where the message directs the Event Service Activator subsystem to pre-activate the selected microservice;
accepting, from the first microservice, a selection of a next function that must be performed by the DBMS in order to process the query; and
repeating the pre-activating and the accepting for each microservice selected to perform a function required to process the query,
  where each pre-activated microservice selects a next microservice of the set of microservices that must be run in order to perform a corresponding next function required to process the query.

15. The computer program product of claim 14,
where the set of microservices is organized into a layered set of components of the DBMS, and
where each component of the layered set of components comprises microservices that perform a corresponding class of functions required to process queries received by the DBMS.

16. The computer program product of claim 15,
where the layered set of components comprises a subset of bind-time components and a subset of runtime components,
where each bind-time component of the subset of bind-time components comprises query-processing bind-time functions that are performed prior to performance of any selected runtime function, where each runtime component of the subset of runtime components comprises query-processing runtime functions performed by runtime microservices that are selected and preloaded prior to performance of any selected runtime function, and where all preloaded runtime microservices are run by a runtime engine of the DBMS to perform database-access operations requested by the received query after all selected bind-time functions have been performed and all selected runtime microservices have been preloaded.

17. The computer program product of claim 16, where the DBMS comprises a cognitive query-processing subsystem that is trained by a computer program product of machine-learning to intelligently draw inferences from records of past DBMS query-processing tasks, and where DBMS determines which query-processing runtime functions to select as a function of a semantic meaning inferred from the received query.

\* \* \* \* \*